United States Patent [19]

Schmid et al.

[11] E Re. 29,916

[45] Reissued Feb. 20, 1979

[54] BOTTLE FOR STERILE DISPENSING OF FLOWABLE CONTENTS

[76] Inventors: Manfred C. Schmid, Anspacher Strasse 39; Rolf R. W. Reiss, Obernhainer Weg 8, both of Bad Homburg, Fed. Rep. of Germany

[21] Appl. No.: 886,197

[22] Filed: Apr. 7, 1978

Related U.S. Patent Documents

Reissue of:

[64] Patent No.: 4,053,648
Issued: Oct. 11, 1977
Appl. No.: 525,441
Filed: Nov. 20, 1974

[51] Int. Cl.[2] ..... A61J 11/00; A61J 15/00

[52] U.S. Cl. ..... 426/117; 215/11 R; 215/11 C; 220/277; 222/81; 426/115

[58] Field of Search ..... 215/11 R, 11 C; 426/115, 117; 206/222, 219; 220/277, 278; 222/81

[56] References Cited

U.S. PATENT DOCUMENTS

| | | | |
|---|---|---|---|
| 2,807,384 | 9/1957 | Lipari | 426/117 |
| 3,146,904 | 9/1964 | Hansen et al. | 215/11 R |
| 3,266,910 | 8/1966 | Barnby | 426/117 |
| 3,358,864 | 12/1967 | Meierhoefer | 426/117 |
| 3,519,157 | 7/1970 | Meierhoefer | 215/11 C |
| 3,635,724 | 1/1972 | Schaar | 426/117 |
| 3,720,523 | 3/1973 | Nakagami | 426/115 |
| 3,720,524 | 3/1973 | Nakagami | 426/115 |
| 3,747,791 | 7/1973 | Fouser | 215/11 R |
| 3,762,540 | 10/1973 | Baumann et al. | 206/219 |
| 3,779,413 | 12/1973 | Pickerell et al. | 426/117 X |
| 3,838,784 | 10/1974 | Barton et al. | 215/11 C |
| 3,840,136 | 10/1974 | Lanfranconi et al. | 206/222 X |

FOREIGN PATENT DOCUMENTS

| | | | |
|---|---|---|---|
| 585716 | 10/1959 | Canada | 215/11 R |

*Primary Examiner*—Steven L. Weinstein
*Attorney, Agent, or Firm*—Fulwider, Patton, Rieber, Lee & Utecht

[57] ABSTRACT

The present invention relates to a combination of a bottle closure device and a complementarily formed bottle top for the sterile dispensing of flowable and/or pasty or viscous, sterile bottle contents, particularly of baby food, whereby the bottle top or its opening provided for the discharge of the contents, respectively, is covered under sterile conditions by a cover or closure wall, and said device being adapted to be attached to said bottle top and including on its inner face cutting means for the opening of said bottle, threads for threading onto the bottle top provided with complementary threads and for the simultaneous actuation of said cutting means, as well as means for the sterile dispensing or removal of the bottle contents after the opening of said bottle.

21 Claims, 10 Drawing Figures

BOTTLE FOR STERILE DISPENSING OF FLOWABLE CONTENTS

Matter enclosed in heavy brackets [ ] appears in the original patent but forms no part of this reissue specification; matter printed in italics indicates the additions made by reissue.

BACKGROUND OF THE INVENTION

When using particularly baby food, such as baby milk, and even other flowable and/or pasty bottled materials, maintaining of the utmost sterility is a prior condition for proper medical use or for a sufficient storability. Hereby, there exists a close technical relationship between the type of the sterile closure of the filled bottles and the manner in which these bottles are opened and put into their contemplated use.

For example, in the case of baby milk and particularly in clinical use where a great number of bottles must be opened and offered to the babies several times a day, it is not only necessary that handling is made under sterile and clean conditions, but also that handling can be made quickly and at low cost. Primarily, however, it depends on the type of the bottling process with what kind of closure the bottles are provided, whereby corresponding devices for opening purposes, in turn, must be adapted to these closures.

For reasons of production processes, the use of membranes or diaphragms attached to the bottle opening under sufficiently aseptic conditions is not possible, such that the bottles must be subjected to a final heat or thermal sterilization after the final bottling step. However, this thermal sterilization to a substantial degree affects the quality of the milk and, besides, involves additional expenditure of production, particularly also in view of the danger of unintentional breaking of the diaphragm. Furthermore, an opening device (Swiss Pat. 525,001) which is known in these respects, has a blunt edge in the bottle cover for opening the associated bottle opening, which edge is capable of opening the bottle only on the condition that the closure diaphragm has a notch of a suitable shape which is aligned with the pressure path of the blunt edge. Hereby, the opening of the diaphragm along the notch is effected by breaking or pressing it open, and not by cutting. Finally, the necessity for a diaphragm notched as a breaking point also increases the danger of unintentionally disturbing the tightness of the sealing and, thus, of a reinfection on the way to the customer, whereby the bottle may become leaky or unservicable, respectively, and its contents may flow out, too.

Another known bottle closure (laid-open German patent application 2,109,743) includes a stopper which is pressed into the bottle through its opening when manipulating the teat drawn over the stopper. Likewise, this bottle closure does not ensure sufficiently aseptic conditions, either, whereby the stopper can cause further restraints by clogging during the dispensing of the bottle content.

These disadvantages are principally eliminated or minimized in the present bottling method wherein the milk which, has been heated to an ultra-high temperature and rendered sterile in advanvce is bottled under aseptic conditions concurrently with the molding of the associated plastic bottle, whereby the upper and face of the bottle is sealed integrally with the remainder of the bottle material such that the bottle and the point of the contemplated opening are of equal strength.

Further, there is known a closure diaphragm made of plastic material and integrally connected to the bottle, whereby the inner face of the threaded cover bears a spike which pierces the closure diaphragm when the cover is threadingly screwed onto the bottle, such that the content of the bottle can be dispensed through the spike which is formed as a tubular member. However, this known opening system suffers from the disadvantage that the spike formed as a tubular member offers a relatively restricted cross-section which, moreover, is susceptible to clogging, too. An unlimited increasing of the diameter of the spike is opposed by constructional difficulties arising in its attachment within the screw-on cap. In particular, when using a tubular spike it is not possible to mount a screen plate or a screen upstream of the passage to the teat in order to prevent clogging of the teat by small compacted particles of the milk.

Accordingly, it is the object of the invention to provide a device for a feeding bottle or the like for babies which reliably eliminates the disadvantages of the conventional bottles of the kind, such that, in particular, not only bottling and storage or transport under absolutely sterile conditions, i.e., without the necessity for a thermal sterilization with the milk being in the bottle, are guaranteed, but also that the contemplated bottle opening may be opened as wide as possible. Primarily, the invention at the same time is contemplated to provide an optimum simple and inexpensive constructional configuration which, with a view to automated mass production, provides a disposable bottle without affecting the criterion of the easy and trouble-free handling from production until after readiness for use.

For the solution of this object, the invention in a device as outlined at the beginning is characterized in that in a bottle made of plastic material which, in the course of molding it under aseptic conditions, is simultaneously filled with sterile bottle contents, and wherein the closure wall covering the contemplated bottle opening is also formed integrally with the remainder of the bottle material, said means for the opening of said bottle includes at least one sharp cutting edge, and there is provided between said opening means and said means for the sterile dispensing of the bottle contents, a screen means to retain chips produced by said cutting edge and other larger particles present within said bottle.

In the combination of an opening means provided with especially a sharp cutting edge and of the screen means, the function according to the invention results from the fact that the cutting edge permits to cut, with low force, an opening into the bottle top even in the case of the special bottles employed which have a relatively thick and tough cover wall, which opening, additionally, defines a flow cross-section of such a magnitude that a screen means may be provided therein without disadvantageously affecting the total flow cross-section, which screen means is effective to retain chips which might have been formed during the process of cutting open the bottle head. Naturally, it is an additional advantage of the preferred screen means that other greater particles, e.g., cloddy portions even of the milk, can be prevented from clogging the teat. In this way, the device according to the invention is always functionable, and the sterility of the milk food cannot be impaired, e.g., by manually grasping the teat if clogging has occured.

By applying the invention, it is possible to separately supply the closed bottles and the devices to be threadingly engaged therewith and serving for the sterile dispensing of the bottle content, whereby the dispensing devices are maintained in a sterile package which can be opened, e.g., by means of a tear-up film or tear-up strip.

Preferably, the device of the above-mentioned kind should be formed in such a manner that there is provided between said device and said bottle neck an unbreakable latch or locking means to prevent inadvertent rotation of said device in that direction in which said cutting edge cuts the opening provided for dispensing the contents, such that no damage of the bottle wall by unintentional movement of the cutting means results during assembling of the cutting means on the bottle head either shortly after the bottling step or at a later point of time. This latch means against unintentional actuation is effective in an advantageous manner both during storing and transporting and during the handling while heating the bottles.

Furthermore, it may be additionally contemplated that the unbreakable latch comprises means for preventing germs from entering into the inner space of the device interiorly of such latch. In such case, the closure device may be attached directly during the bottling step of the bottle and left on the bottle until its contents are consumed. Alternatively, the closure device may be supplied in a sterile container and attached to the bottle head at a later point of time.

According to the invention, the cutting edge is secured to the device so as to be snapped into the latter to be fixed against rotation and axial displacement, and such cutting edge is made of metal.

In combination therewith, said means provided on the inner face of said device is positioned such as to sealingly enclose under sterile conditions an inner space interiorly of said device in which said cutting edge is maintained in readiness above the unopened bottle.

According to the invention, to this end there is provided particularly a separate gasket extending around the bottle neck within the closed annulus, which gasket is adapted to exert a sufficient sealing pressure while being independent of the threads per se. This gasket seals the interior space around the bottle opening and interiorly of the teat from the time when the threaded closure device is mounted to the bottle head under sterile conditions, substantially until the time when the bottle is used, and at the same time, as a combination effect, forms an effective lock or latch against unintentional actuation of the threaded closure device beyond its permissible position of readiness. This holds true both for the threading engagement of the threaded closure device during assembling, and for the handling during shipment and storage. Thereafter, assembling can be effected directly at factory or, alternatively, at a time shortly before use.

Hereby, the device may either comprise a continuous annular bead in the inner face of the device and a corresponding dual bead disposed around the bottle neck, which form the sealing means, whereby the bead provided in the device sealingly engages into the fillet defined between said dual bead, or analogously, a continuous annular dual bead and a corresponding single bead or stop around the bottle neck may form the sealing means. The described beads and fillets constitute some of many equivalent solutions only, whereby, advantageously, the beads forming the sealing means may be integrally connected to the respectively associated part at least in the device or on the bottle neck.

A particularly advantageous material combination resides in that said device consists of a hard plastic material, and the bottle neck consists of soft plastic material.

An advantageous overall combination consists in that said means for the sterile removal or discharge of the bottle contents is connectible to said inner space through an opening in the cover end face of said device and said means is maintained with its outer edge (radial flange) in abutment with the rear face of a marginal flange of said cover end face surrounding said opening; said cutting edge being formed as a portion separate from said device and disposed with butting engagement on the side of said dispensing means directed towards the interior of said device; and said cover end face or end wall, including said dispensing means, is covered under sterile conditions by a protective hood which is removably secured to the lateral edge of said device.

The dispensing means may comprise — for conventional use — a baby teat or, alternatively, a toughly flexible membrane or diaphragm which, when pierced by a cannula, retains the latter against sliding out therefrom and seals the edge of the pierced hole, and simultaneously clamps the cannula. Similarly, the dispensing means may comprise a sealing projection or fitting on the cover end face for attachment of a probe connection, or for the removal of a pasty bottle content, a body formed in a spoon-shaped fashion and including cover flaps or a pair of parts contacting each other in lip-like fashion.

Accordingly, the device according to the invention is not only useful for feeding bottles, but also for infusion liquids or for blood plasma containers or the like. With the spoonlike or lip-shaped dispensing means, the invention is also applicable to sick diet in paste form (or optionally also in powderous form) and also for the feeding in extreme situations, such as in astronautics.

Particularly advantageous constructional embodiments which at the same time facilitate the assembling which must be performed under sterile conditions, could consist in that said cutting means is secured within said device against rotation and fixed against axial displacement with a snap fit on the one hand by means of projections (bosses) provided on its lateral edge and on the other hand by means of recesses at positions of the inner face of said device corresponding to the inserting position or location of said cutting means. The reversed arrangement offers the same advantages, too.

It is also possible — with a certain telescoping effect — that said cutting means is mounted against rotation in said device by means of a knurled rim provided on its lateral edge or by means of separate teeth of such rim and corresponding (complementary) axially extending recesses at positions of the inner face of said device corresponding to the inserting position of said cutting means, and fixed against axial movement by a bead-shaped projection provided on the inner face of said device on the side of said cutting means which is directed away from said dispensing means, whereby said cutting means is adapted to be attached to or inserted into said device by snapping in behind said projection.

Particular advantages with respect to manufacturing can be obtained if said cutting means is stamped from metal, and projections (bosses) at positions on the inner face of said device, which inner side tapers conically in this case, corresponding to the location of said cutting means serving to wedge said cutting means with a snap fit against rotation and against axial displacement within said device.

It may be of additional advantage if a sealing washer is positioned between said cutting means and said bottle top such that a sealed connection is provided when the bottle opening is cut open.

Maintaining of the sterility can be improved in that the apparatus includes around the upper lateral edge adjacent said cover and face and extending up to an annular shoulder a smaller diameter portion in which the free edge of said protective hood is positioned, whereby the outer surface of said edge of said hood and the height of said annular shoulder are related to each other in such a manner that these parts are flush with each other.

If the edge of the protective hood is hereby secured by an adhesive tape or by a tear-up tape construction, a multiple seal is obtained in teats consisting of non-weldable latex, namely on the one hand by the adhesive tape, further by the tight fit of the teat on the device and, finally, by the radial flange of the teat which is clamped between the cutting means and the marginal flange of the end wall.

In the following, several embodiments of the invention are explained in greater detail by referring to the accompanying drawings, wherein.

Figure 1:
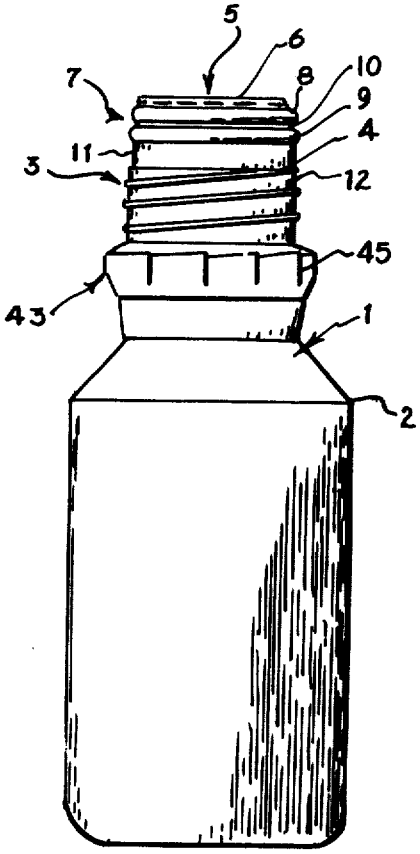
FIG. 1 is a schematical view of the bottle portion of the device according to the invention with the opening and closure cap device removed, with FIG. 2 showing a plan view of this bottle portion.

The bottle 1 illustrated in the Figures includes a bottle body 2 having a bottle top which is formed as a bottle neck 4. The contents filled in the bottle 1 are sealed under sterile conditions by closing the opening end face 5 of the bottle neck 4. The sealing wall 6 attached to the end face 5 of the opening may be formed as a diaphragm-like thin portion formed integrally with the material of the bottle if the bottle is manufactured from plastic material in a manufacturing step combined with the filling thereof using a conventional blow-molding and filling operation.

Slightly below the end face 5 of the bottle neck 4 there is provided around the latter an annular latch or locking means which may also comprise a continuous sealing means or gasket 7 which is formed in the bottle neck 4 by a pair of adjacently disposed, parallel beads 8 and 9 with a recess or fillet 10 therebetween.

Positioned with a certain spacing from the latch 7 or gasket as defined, e.g., by a cylindrical, straight portion 11, screw threads 12 are provided in the neck 4 extending towards the bottle body 2, which threads may be additionally followed by a non-reversing lock 43 having ratchet teeth 45 on the bottle body 2. However, this non-reversing lock is not absolutely necessary, and it does not form part of the invention.

Figure 3:
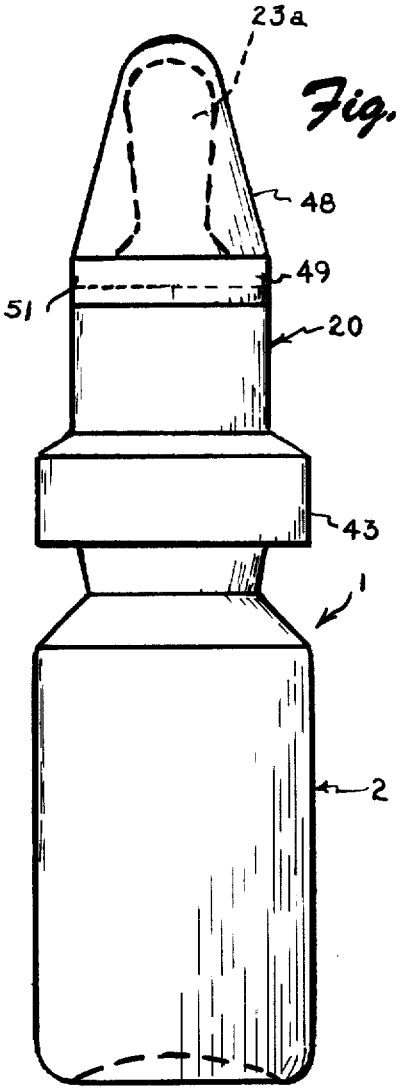
FIG. 3 is a schematical view of the device according to the invention with the opening and closure cap device attached to the bottle portion.
Figure 5:
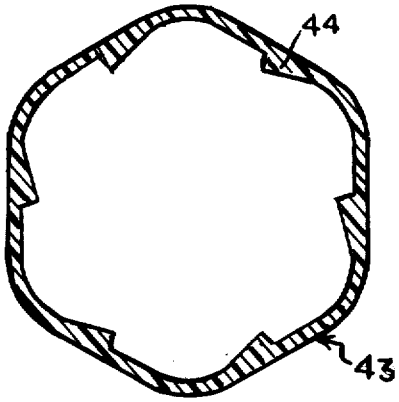
FIG. 5 shows a plan view of this closure device.
Figure 4:
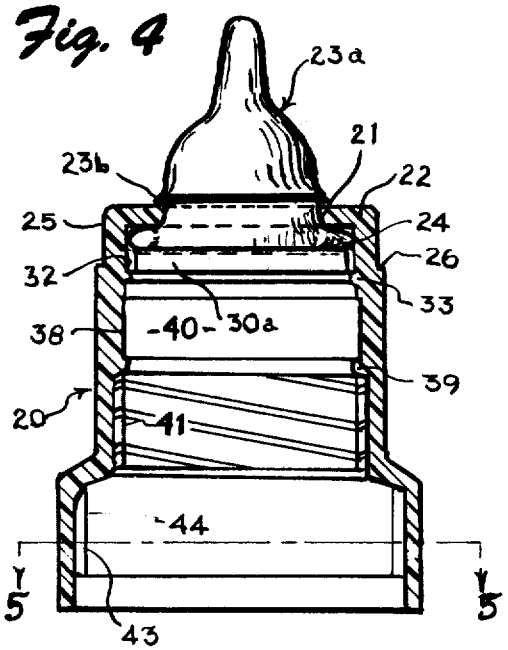
FIG. 4 is a schematical view in longitudinal section through the opening and closure cap device according to the invention.

The opening and closure cap device 20 which is threadingly attached to the bottle neck 4 as shown in FIG. 3, includes an end opening 21 in its upper end face according to FIG. 4, through which opening a dispensing means 23 is accessible.

Figure 8:
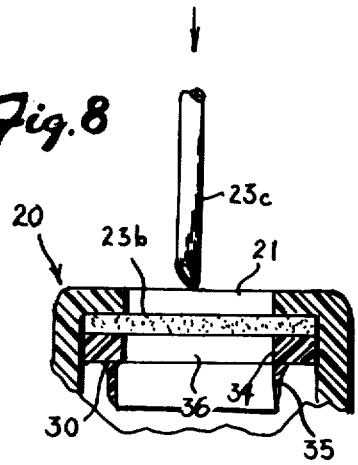
FIGS. 8 – 10 are sectional part views of various embodiments of dispensing means.
Figure 9:
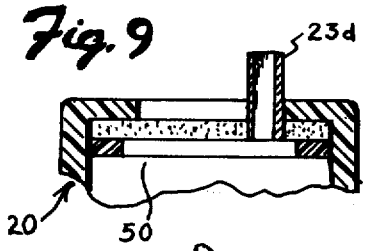
Figure 10:
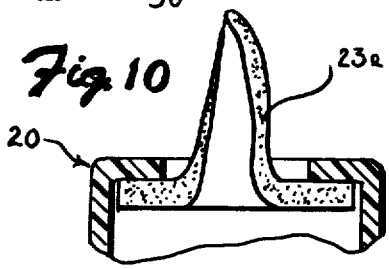
Figure 2:
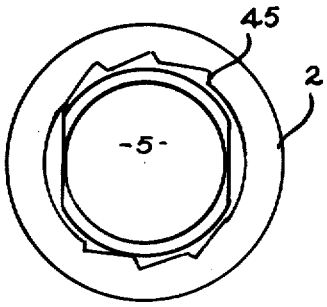

Provided that the dispensing means 23 comprises a baby teat 23a (as shown in FIG. 4), the teat portion may protrude from the end opening 21 to the outside such that the teat is accessible to be taken up by the baby's mouth. Likewise, in the construction of the dispensing means 23 as a spoon-shaped or lip-like device 23e wherein, for instance, a pocket protruding in the form of a spoon is covered by a tongue-shaped flap such that e.g. paste-like, i.e. viscous food can be removed from this device, the dispensing means extends outwardly beyond the end face of the opening and closure device 20. The same applies to the construction of the dispensing means 23 in the form of a lip valve-like structure. However, if the bottle 1 according to the invention is used e.g. as an infusion liquid reservoir, the dispensing means 23 may comprise a more or less thick diaphragm 23b being disposed behind the end opening 21 and being accessible through the latter. Similarly the same applies to the construction of the dispensing device 23 in the form bearing a probe-like connection or fitting 23d as shown in FIG. 9 or receiving a cannula 23c as shown in FIG. 8.

The edge of the dispensing means 23 is formed as a radial flange 24 being disposed interiorly of said opening and closure device 20 behind the marginal flange 22 extending around the end opening 21. If the dispensing device 23 extends outwardly through the end opening 21 (e.g. in the case of the baby teat 23a), the dispensing means 23 may include a small ledge 23b around the upper edge of the end opening 21, which ledge during assemblying automatically retains e.g. a teat 23a in the end opening.

Figure 6:
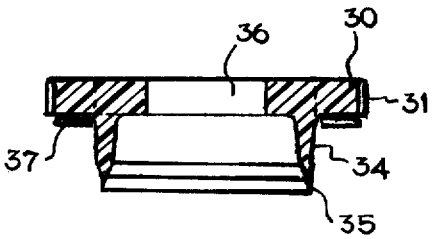
FIG. 6 shows on a slightly enlarged scale a detail of the interior region of the present device according to FIG. 4.

Within the space 30a in FIG. 4, there is provided the annular plate 30 which is shown on an enlarged scale in FIG. 6 and the upper face of which contacts the opposed face of the radial flange 24.

The annular plate 30 which may comprise a stamped sheet metal part, includes a central opening or aperture 36 (or a plurality of similar openings), and is provided on its lower face with cutting means 34 which may be either of continuously cylindrical configuration or formed of separate teeth (which teeth may be, for example, punched out and bent down in the stamping step of the central opening 36). At its downwardly directed edge, the cutting means 34 includes a sharp cutting edge 35 which may be formed to extend slightly outwards in radial direction. At the lower face of its outer edge, the annular plate 30 may have a preferably resilient sealing washer or gasket 37 which, when threadingly engaged with the bottle neck 4, seals the upper edge of the latter.

Figure 7:
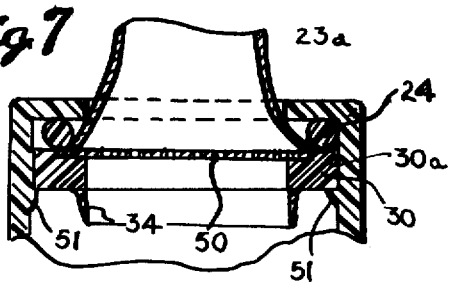
FIG. 7 shows a sectional part view, on enlarged scale, of modified embodiment of the attachment of the cutting means interiorly of the closure device.

The annular plate 30 may be provided on its radially outer periphery with elements 31 which, optionally are in positive engagement with corresponding elements 32 at the associated inner face of said device 20 and which hold the annular plate 30 including its cutting means 34 against rotation. The elements 31 and 32 may comprise either a knurled spline assembly which provides a certain degree of axial movability, or a corresponding (complementary) groove and land assembly which retains the annular plate 30 not only against rotation, but also against displacement in axial direction. Where the elements 31 and 32 comprise a knurled spline assembly or the like, an axial retainer member 33 is provided on the axially inwardly directed face of the annular plate 30 at the opening and closure means, which retainer member may be formed as a bead-shaped projection or merely as a boss or knob. However, the elements 31 and 32 as well as the axial retainer member 33 must be formed in such a manner that the annular plate 30 after the insertion of the dispensing means 23 may be snapped into these retainer elements with slight pressure so as to be secured therein against rotation and axial displacement, whereby the cutting means 34 is directed downwardly. Particulary if a soft, resilient sealing washer 37 is provided, preferably it may be sufficient to omit the elements 31 and 32 because the resilience of the radial flange 24 and perhaps also of the sealing washer 37 allows the annular plate 30 to be pressed in behind the axial retainer member 33 in such a manner that said plate 30 is secured against rotation by a tight fit. Directly over the opening 21, there is provided as the screen means 50 a fine-mesh screen 50 which, as shown in FIG. 7, may also be sunk into the surface of the annular plate 30. The screen or screen means 50 according to FIG. 7, may be made of a thin plastic gauze or even of a stainless screen gauze, and it may be stamped circularly and with such a diameter that the edge of the screen, when inserted into the annular plate 30, is clamped between the latter and at least the inner edge of the bead (radial flange 24) of the teat 23b.

Approximately in the cylindrical portion 11 of the bottle neck, within said device 20 there is provided a clearance, defined by the spacing 38, with respect to the counter threads on the inner face of said device 20 complementary to the screw threads 12. When said device 20 is screwed onto the bottle neck the upper side of the bottle neck 4 extends into this interior space 40 from below, and the cutting means 34 extends into this space from above, the arrangement being such that said cutting means 34 in the unopened condition of the bottle 1 is positioned closely above the closure wall 6.

The interior space 40 is sealed under absolutely sterile conditions by means of a sealing bead 39 which, when the bottle according to the invention is assembled ready for use, engages in germ tight manner into the fillet 10 between the beads 8 and 9 of the sealing means of gasket 7 on the bottle neck 4. Within the interior space of said device 20, the sealing bead 39 is followed by the counter threads 41 while the ratchet wheel 44 of the non-reversing lock 43 is positioned therebelow.

While the bottle 1 including its bottle top 4 formed in accordance with the invention, on the one hand, and the opening and closure means 20 including its only two inner portions (dispensing means 23 and annular plate 30), on the other hand, may be manufactured separately under absolutely sterile conditions, the subsequent readiness for use may be likewise ensured under correspondingly sterile conditions by attaching the opening and closure means, e.g. with one turn, onto the bottle neck 4 to such extent that the sealing means comprising the beads 8 and 9 as well as 39 and the fillet 10 come into snap-on engagement. In such engaged condition, the threads 12 and 41 still further contribute to the sterile condition. This snap-on condition secures said device 20 to the bottle neck 4 in an extremely grip and threading proof state, so that no unintentional further rotation, and thus no opening of the closure wall 6, is possible. Consequently, a combination of the sterile gasket 7 consists in that it forms an anti-rotation lock and a sealing means at the same time.

In the contemplated use of the bottle 1 according to the invention, the opening and closure device 20 is rotated to greater degree with somewhat increased force, whereby the threads 12, 41 advance the opening and closure device 20 towards the bottle top 3 such that this drawing rotational movement ultimately causes the bead 39 to slip out of the fillet 10 and to permit the free rotatability of the opening and closure device 20. Hereby, the cutting means 34 can break up the closure wall 6 such that the content of the bottle flows through the opening 36 to the inner side of the dispensing means 23 and is available at the latter.

The dispensing means 23 is covered to maintain the sterile condition by means of a protective hood 48 provided around its outer face, which hood with its free edge 49 is pulled over a portion 25 of smaller diameter at the upper edge of the opening and closure device 20 and against an annular shoulder 26, whereby the outer face of the hood 48 is preferably flush with the remaining portion of said device 20 so that, as shown in FIG. 3, a tear-up tape 51 or an adhesive tape or the like may be adhesively attached over the joint between the free edge 49 of the hood 48 and the annular shoulder 26; in this way, absolutely sterile conditions are secured also ath the outer face of the dispensing means 23.

What we claim is:

1. The combination of a bottle closure device having an interior chamber and an internally threaded lower neck, dispensing means carried on and extending through an opening in the upper end of said closure device and in dispensing communication with said interior chamber, closure means mounted in sealed engagement to the upper end of said closure device and covering said dispensing means; a bottle containing flowable contents having a bottle top with complementary external threads along a portion of its length and received within the lower end of said closure device for the sterile storage and dispensing of said flowable contents and having a continuous unbroken integrally formed top wall on said bottle top effective to maintain sterile conditions in said bottle; cutting means mounted in the interior chamber of and carried by said closure device in axial proximity to said top wall such that the cutting means can be displaced into cutting engagement with said top wall by axial advance of said closure device in its threaded engagement on said bottle top; screen means carried within said interior chamber of said device to retain any chips produced by said cutting means from being dispensed through said dispensing means; and a pair of closely spaced annular beads with a fillet therebetween on said bottle top axially spaced from said external threads and received within said closure device and a cooperative annular bead on said neck of said closure device axially spaced form the internal threads thereon, said cooperative annular bead received within said fillet to provide restraining and microbiological sealing means, yieldably restraining said axial displacement of said device on said bottle top to prevent inadvertent rotation of and axial displacement of closure device and displacement of said cutting means toward said top wall, and microbiologically sealing said interior chamber to the environment.

2. The combination of claim 1 wherein said bottle top includes a bottle neck received in the threaded neck of said device and bearing said closely spaced annular beads.

3. The combination according to claim 2 wherein said annular beads are integral with said bottle neck.

4. The combination according to claim 2 wherein said closure device consists of a hard plastic material and said bottle neck consists of a soft plastic material.

5. The combination according to claim 1 wherein said cutting means comprises a plate bearing downwardly dependent punch means and mounted with its upper face in abutment with the under side of said dispensing means.

6. The combination according to claim 5 wherein said cutting means bears detent means about the periphery of said plate to secure said plate against rotation about the inner wall of said device.

7. The combination according to claim 6 wherein said cutting means is positioned within the interior chamber of said closure device with a resilient sealing washer on its underside with subjacent protrudances on the inner wall of said closure device to retain said cutting means against movement.

8. The combination according to claim 5 wherein said cutting means is fixedly secured within said closure device against rotation and against axial displacement by teeth carried on the periphery of said plate which yieldably engage cooperative recesses in the inner wall of said closure device.

9. The combination according to claim 5 wherein said cutting means is fixedly mounted against rotation in said closure device by a splined fit between the periphery of its plate and the inner wall of said closure device and is fixed against axial movement by a bead-shaped projection about the inner wall of said closure device beneath said plate whereby said cutting means is received in said closure device by snapping said plate over said projection.

10. The combination according to claim 5 wherein said punch means is a metal stamping having a downwardly directed cutting edge with a slight radially outward taper.

11. The combination according to claim 5 including an annular sealing washer about said punch means on the undersurface of said plate and positioned to seal between said cutting means and said bottle top.

12. The combination according to claim 1 including an annular flange in the upper end face of said closure device defining said opening to receive said dispensing means retained therein by a radial flange of said dispensing means which is in abutment with the inner face of said annular flange in the upper end of said closure device, and said closure means comprises a protective hood which is removably mounted over said dispensing means and seated in an annular shoulder about said device.

13. The combination according to claim 12 wherein said dispensing means comprises a teat having its mouthpiece portion extending through said opening in said upper end of said closure device so as to be freely accessible when said closure means is removed from said closure device.

14. The combination according to claim 12 wherein said dispensing means comprises a diaphragm extending across said opening and bearing a tubular probe extending therethrough.

15. The combination according to claim 12 wherein said dispensing means comprises a spoon-shaped projection and a coextensive tongue-shaped flap which extend through said opening.

16. The combination according to claim 1 wherein the upper end of said closure device bears an annular shoulder about its outer wall for removable seating of the lower end of said closure means.

17. The combination according to claim 16 wherein said closure means seats on said annular shoulder with its outer surface flush with the outer surface of said closure device.

18. The combination according to claim 17 wherein the edge of said closure means is secured to said closure device by an adhesive tape.

19. The combination according to claim 16 wherein the edge of said closure means is secured to said closure device by a tear-up tape closure device.

20. The combination according to claim 1 wherein said closure device bears ratchet lock means on its lower end in cooperative engagement with lock means carried on said bottle top.

21. The combination according to claim 20 wherein said ratchet lock means comprises ratchet teeth which register with cooperative ratchet teeth on said bottle top to prevent reverse rotation of said closure device over substantially the full extent of the axial movement provided by said threaded engagement.

* * * * *

UNITED STATES PATENT AND TRADEMARK OFFICE

CERTIFICATE OF CORRECTION

PATENT NO. : Re. 29,916

DATED : February 20, 1979

INVENTOR(S) : Manfred C. Schmid et al.

It is certified that error appears in the above-identified patent and that said Letters Patent are hereby corrected as shown below:

Claim 19, line 3, delete "closure device".

Signed and Sealed this

*Eighteenth* Day of *September 1979*

[SEAL]

*Attest:*

*Attesting Officer*

LUTRELLE F. PARKER

*Acting Commissioner of Patents and Trademarks*

UNITED STATES PATENT AND TRADEMARK OFFICE

CERTIFICATE OF CORRECTION

PATENT NO. : Re. 29,916

DATED : February 20, 1979

INVENTOR(S) : MANFRED C. SCHMID and ROLF R. W. REISS

It is certified that error appears in the above-identified patent and that said Letters Patent are hereby corrected as shown below:

Title page, after line [64[ material insert --[30] Foreign Application Priority Data November 21, 1974 Germany 23 58128 --

Signed and Sealed this

*Thirteenth* Day of *May 1980*

[SEAL]

*Attest:*

SIDNEY A. DIAMOND

*Attesting Officer* *Commissioner of Patents and Trademarks*

UNITED STATES PATENT AND TRADEMARK OFFICE

CERTIFICATE OF CORRECTION

PATENT NO. : Re. 29,916

DATED : February 20, 1979

INVENTOR(S) : Manfred C. Schmid and Rolf R. W. Reiss

It is certified that error appears in the above-identified patent and that said Letters Patent are hereby corrected as shown below:

Title page, after line [64] material insert --[30] Foreign Application Priority Data November 21, 1973 Germany 23 58128 --

This certificate supersedes Certificate of Correction issued May 13, 1980.

Signed and Sealed this

*Ninth* Day of *September 1980*

[SEAL]

*Attest:*

SIDNEY A. DIAMOND

*Attesting Officer* *Commissioner of Patents and Trademarks*